United States Patent [19]

Vestergaard et al.

[11] 3,943,101

[45] Mar. 9, 1976

[54] PROCESS FOR PREPARING POLYCARBONATES WITH A METAL CHELATING AGENT

[75] Inventors: Jorgen H. Vestergaard; Gary W. Ragsdale, both of Mt. Vernon, Ind.

[73] Assignee: General Electric Company, Pittsfield, Mass.

[22] Filed: May 31, 1974

[21] Appl. No.: 475,131

[52] U.S. Cl. .................... 260/45.85 R; 260/47 XA
[51] Int. Cl.² ............................................ C08J 3/20
[58] Field of Search ................ 260/45.85 R, 47 XA

[56] References Cited
UNITED STATES PATENTS

| | | | |
|---|---|---|---|
| 3,492,268 | 1/1970 | Baker.................................... | 260/47 |
| 3,635,895 | 1/1972 | Kramer.................................. | 260/47 |
| 3,763,063 | 10/1973 | Factor................................ | 260/45.85 |

Primary Examiner—V. P. Hoke
Attorney, Agent, or Firm—Donald M. Papuga; William F. Mufatti

[57] ABSTRACT

An improved process for preparing a color stable polycarbonate by carrying out the reaction in the presence of an additive. The additive employed herein is gluconic acid or its alkali metal salts.

11 Claims, No Drawings

PROCESS FOR PREPARING POLYCARBONATES WITH A METAL CHELATING AGENT

This invention relates to an improved process for preparing a color stable aromatic carbonate polymer by reacting a dihydric phenol and an alkali metal hydroxide with a carbonate precursor, the improvement which comprises carrying out the reaction in the presence of gluconic acid or its alkali metal salts.

BACKGROUND OF THE INVENTION

Polycarbonates are well-known thermoplastic materials finding a wide range of uses, particularly for injection molding applications. However, many of the ingredients which go into the preparation of the polycarbonate, contain metallic contaminants such as nickel, copper and iron. These contaminants cause the polycarbonate to be thermally unstable by affecting the initial color and the color stability of the polycarbonate under molding and or heating conditions. The polycarbonate is so affected when the amount of the contaminant exceeds about 0.2 parts per million. Since polycarbonates are used in the manufacture of molded products, this discoloration and instability which occurs upon, in, or after molding is very objectionable. Several attempts have been made to correct these problems; however, most of these attempts have somewhat limited success. Heating or molding of polycarbonate polymers containing these metallic contaminants has invariably resulted in discoloration of the product.

It has been discovered that by adding gluconic acid or its alkali metal salts during the preparation of the polycarbonate, color and thermally stable polycarbonates are produced.

DESCRIPTION OF THE INVENTION

This invention is directed to an improved process for preparing an aromatic carbonate polymer by reacting a dihydric phenol and an alkali metal hydroxide with a carbonate precursor, the improvement which comprises carrying out the reaction in the presence of a stabilizing amount of gluconic acid or its alkali metal salts.

The gluconic acid or its alkali metal salts are used in stabilizing amounts. Preferably, this stabilizing amount is from about 0.1 to about 2.0 weight percent based on the weight of the dihydric phenol. In these amounts, gluconic acid or its alkali metal salts impart improved base molded color and thermal stability to the polycarbonate. A preferred additive is sodium gluconate.

The stabilizing amount of gluconic acid or its alkali metal salts substantially removes the metal contaminants, i.e., nickel, copper and iron by forming a complex with the metal contaminant. This complex is soluble in the aqueous phase which can be easily removed thus leaving the polycarbonate substantially free of these metal contaminants.

The dihydric phenols that can be employed are bisphenols such as bis(4-hydroxyphenyl) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2,2-bis(4-hydroxy-3,5-dichlorophenyl) propane, 2,2-bis(4-hydroxy-3,5-dibromophenyl) propane, etc., dihydric phenol ethers such as bis(4-hydroxyphenyl) ether, bis(3,5-dichloro-4-hydroxyphenyl) ether, etc.; dihydroxydiphenyls such as p,p'-dihydroxydiphenyl, 3,3'-dichloro-4,4'-dihydroxydiphenyl, etc., dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2,5-dichlorobenzene, 1,4-dihydroxy-3-methyl-benzene, etc., and dihydroxy diphenyl sulfoxides such as bis(4-hydroxyphenyl) sulfoxide, bis-(3,5-dibromo-4-hydroxyphenyl) sulfoxide, etc. A variety of additional dihydric phenols are also available to provide carbonate polymers and are disclosed in U.S. Pat. Nos. 2,999,835, 3,028,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl) propane, 2,2-bis(3,5-dibromo-4-hydroxyphenyl) propane (hereinafter referred to as tetrabromobisphenol-A), etc. Also employed in the practice of this invention may be blends of any of the above materials to provide the aromatic carbonate polymer.

The carbonate precursor employed in the practice of this invention can be either carbonyl halide or a haloformate. The carbonyl halides which can be employed herein are carbonyl bromide, carbonyl chloride, carbonyl fluoride, etc. or mixtures thereof. The haloformates suitable for use herein include bishaloformates of dihydric phenol (bischloroformates of hydroquinone, etc.) or glycols (bishaloformates of ethylene glycol, neopentyl glycol, polyethylene glycol, etc.). Although the carbonate precursors will occur to those skilled in the art, carbonyl chloride, also known as phosgene is preferred.

Molecular weight regulators which can be employed in carrying out the process of this invention for preparing the aromatic carbonate resins can be such molecular weight regulators as phenol, cyclohexanol, methanol, paratertiarybutylphenol, parabromophenol; monofunctional organic acids, that is benzoic acid, acetic acid; and monofunctional alcohols such methanol, ethanol. The amounts employed generally vary between 0.5 to about 4 weight percent, based on the weight of the dihydric phenol originally charged to the reaction mixtures.

Polymerization catalysts which may also be employed herein can be any of the suitable catalysts that aid the polymerization of bisphenol-A with phosgene. Suitable catalysts are tertiary amines such as for example, triethylamine, tripropylamine, n,n-dimethylaniline, quaternary ammonium compounds such as for example tetraethylammonium bromide, cetyl triethyl ammonium bromide, tetra-n-heptyl ammonium iodide, tetra-n-propyl ammonium bromide, tetramethyl ammonium hydroxide, tetra-n-butyl ammonium iodide, benzyltrimethyl ammonium chloride and quaternary phosphonium compounds such as for example, n-butyltriphenyl phosphonium bromide and methyltriphenyl phosphonium bromide.

The alkali metal hydroxide employed in the practice of this invention is selected from the group consisting of potassium hydroxide, sodium hydroxide, and lithium hydroxide.

Additionally, thermoplastic randomly branded polycarbonates are included within the scope of this invention. They are prepared by reacting a polyfunctional organic compound with a dihydric phenol and a carbonate precursor. The polyfunctional organic compound which may be included within the scope of this invention are set forth in U.S. Pat. No. 3,635,895 which is incorporated herein by reference. A preferred polyfunctional organic compound is diphenolic acid.

A method of practicing this invention involves passing phosgene, for example, into a reaction mixture containing a dihydric phenol, an aqueous solution of an alkaline metal hydroxide, the additive of the instant invention and an inert organic solvent such as methylene chloride, ethylene dichloride and the like. Molecular weight regulators and reaction catalysts may be used as desired.

PREFERRED EMBODIMENT OF THE INVENTION

The following examples are set forth to illustrate more clearly the principles and practices of this invention to those skilled in the art. Unless otherwise specified, where parts are mentioned, they are parts be weight.

EXAMPLE I 37.2 gallons of distilled water, 200 pounds of bisphenol-A 700 ml. of triethylamine, 1800 grams of p-tertiary butylphenol 60 gallons of methylene chloride are charged to a glasslined reaction kettle fitted with an agitator, reflux condenser and pH electrodes. The mixture is agitated for about 10 minutes. Phosgene is then added at the rate of 100 pounds per hour along with sufficient commercial grade 50% aqueous sodium hydroxide solution to maintain a pH of 11.0 during the reaction.

Phosgene addition is continued until the reaction with bisphenol-A is complete as determined by phosgene blow-by and disappearance of free monomer.

EXAMPLE II

Example I is repeated with the exception that 0.4 pounds of sodium gluconate is added to the reaction kettle.

EXAMPLE III 37.2 gallons of distilled water, 200 pounds of bisphenol-A, 700 ml. of triethylamine, 1800 grams of p-tertiarybutylphenol, 60 gallons of methylene chloride, 2 pounds diphenolic acid are charged to a glasslined reaction kettle fitted with an agitator, reflux condenser and pH electrodes. The mixture is agitated for about 10 minutes. Phosgene is then added at the rate of 100 pounds per hour along with 50% aqueous sodium hydroxide solution to maintain a pH of 6.0 for the first 25% of the reaction and a pH of 11.0 during the remainder of the reaction.

EXAMPLE IV

Example III is repeated except that 0.4 pounds of sodium gluconate is added to the reaction kettle.

The organic phase of the reaction mixture prepared in Examples I through IV was isolated by decantation and the iron content of the dissolved carbonate polymer determined by conventional techniques. The results are tabulated in Table I as follows:

TABLE I

| EXAMPLE | IRON CONTENT OF POLYMER |
| --- | --- |
| I | 0.79 ppm |
| II | 0.17 ppm |
| III | 1.23 ppm |

TABLE I-continued

| EXAMPLE | IRON CONTENT OF POLYMER |
| --- | --- |
| IV | 0.20 ppm |

EXAMPLE V 37.2 gallons of distilled water, 100 pounds of bisphenol-A, 100 pounds of tetrabromobisphenol-A, 2800 ml. of triethylamine, 1800 grams of p-tertiarybutylphenol, 60 gallons of methylene chloride are charged to a glasslined reaction kettle fitted with an agitator, reflux condenser and pH electrodes. The mixture is agitated for about 10 minutes. Phosgene is then added at the rate of 100 pounds per hour along with 50% aqueous sodium hydroxide solution to maintain a pH of 11.0 during the reaction.

EXAMPLE VI

Example V is repeated except that 0.4 pounds of sodium gluconate is added to the reaction vessel.

The carbonate polymers prepared in Examples I through VI were purified and isolated by techniques well known to those skilled in the art. Parts were molded from these polymers and the color of these parts were measured. The results were tabulated in Table II.

TABLE II

| EXAMPLE | APHA COLOR |
| --- | --- |
| I | 37.5 |
| II | 27 |
| III | 101 |
| IV | 34.5 |
| V | 87.5 |
| VI | 55 |

As is seen from Table I, the metal content of the polymer of Examples I and III prepared without the additive is 0.79 and 1.23 ppm, respectively while using the additive of the instant invention the metal content of the polymer is reduced to 0.17 and 0.20 ppm, respectively. Table II discloses that the polymer prepared from Examples I, III and V, respectively has a higher APHA color number than the corresponding polymer prepared with the additive of the instant invention, which indicates that the polymer prepared using the additive of the instant invention suffers less discoloration than the polymer prepared without.

It will thus be seen that the objects set forth above among those made apparent from the preceding description are efficiently attained, and since certain changes may be made in carrying out the above process without departing from the scope of this invention, it is intended that all matters contained in the above description shall be interpreted as illustrative and not in a limiting sense.

What is claimed is:

1. In a process for preparing a color stable aromatic carbonate polymer by reacting a dihydric phenol and an alkali metal hydroxide with a carbonate precursor, the improvement which comprises carrying out the reaction in the presence of a stabilizing amount of gluconic acid or its alkali metal salts.

2. The process of claim 1 wherein the dihydric phenol is 2,2-bis(4-hydroxyphenyl) propane.

3. The process of claim 1 wherein the carbonate precursor is phosgene.

4. The process of claim 1 wherein a polyfunctional organic compound is reacted with the dihydric phenol and the carbonate precursor.

5. The process of claim 4 wherein the polyfunctional organic compound is diphenolic acid.

6. The process of claim 1 wherein the dihydric phenol is a halogen substituted dihydric phenol.

7. The process of claim 6 wherein the halogen substituted dihydric phenol is tetrabromobisphenol-A.

8. The process of claim 1 wherein the dihydric phenol is a combination of dihydric phenol and a halogen substituted dihydric phenol.

9. The process of claim 1 wherein the alkali metal hydroxide is sodium hydroxide.

10. The process of claim 1 wherein the alkali metal salt of gluconic acid is sodium gluconate.

11. The process of claim 1 wherein the stabilizing amount of gluconic acid or its alkali metal salts is from about 0.1 to about 2.0 weight percent based on the weight of dihydric phenol.

* * * * *